United States Patent
Braedt

(10) Patent No.: US 10,253,865 B2
(45) Date of Patent: Apr. 9, 2019

(54) MULTI-GEAR CASSETTE AND DAMPING DEVICE

(75) Inventor: Henrik Braedt, Gebrunn (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 510 days.

(21) Appl. No.: 13/371,229

(22) Filed: Feb. 10, 2012

(65) Prior Publication Data

US 2012/0208662 A1 Aug. 16, 2012

(30) Foreign Application Priority Data

Feb. 10, 2011 (DE) .................. 10 2011 010 855

(51) Int. Cl.
| | |
|---|---|
| *B62M 9/10* | (2006.01) |
| *F16H 55/14* | (2006.01) |
| *B62D 55/096* | (2006.01) |
| *F16H 55/30* | (2006.01) |

(52) U.S. Cl.
CPC ......... *F16H 55/14* (2013.01); *B62D 55/0963* (2013.01); *B62M 9/10* (2013.01); *F16H 2055/306* (2013.01)

(58) Field of Classification Search
CPC .... F16H 55/30; F16H 2055/306; F16H 55/14; F15H 55/14; B62D 55/096; B62D 55/0963; B62D 55/0966
USPC .......................... 474/160, 161, 153, 155, 156
See application file for complete search history.

(56) References Cited

U.S. PATENT DOCUMENTS

| | | | | |
|---|---|---|---|---|
| 975,938 A | * | 11/1910 | Downey | 474/161 |
| 2,953,930 A | * | 9/1960 | Meyer | 474/148 |
| 3,057,219 A | * | 10/1962 | Montgomery | 474/161 |
| 4,332,574 A | * | 6/1982 | Aoyama et al. | 474/161 |
| 6,805,645 B2 | * | 10/2004 | Mao et al. | 474/160 |
| 7,032,983 B2 | * | 4/2006 | Wu et al. | 305/195 |
| 7,094,170 B2 | * | 8/2006 | Young | 474/161 |
| 2004/0204274 A1 | * | 10/2004 | Young | 474/156 |
| 2007/0293361 A1 | * | 12/2007 | Young | 474/152 |
| 2009/0093329 A1 | * | 4/2009 | Markley et al. | 474/161 |
| 2010/0075791 A1 | * | 3/2010 | Braedt | 474/160 |
| 2011/0053721 A1 | * | 3/2011 | Kamada | 474/160 |
| 2011/0300977 A1 | * | 12/2011 | Hayami et al. | 474/161 |

FOREIGN PATENT DOCUMENTS

| | | |
|---|---|---|
| EP | 2165927 | 3/2010 |
| EP | 1943443 | 8/2010 |
| EP | 2289793 | 3/2011 |
| KR | 20060062511 | 6/2006 |
| WO | 03095867 | 11/2003 |

* cited by examiner

*Primary Examiner* — Minh Truong

(57) ABSTRACT

The invention relates to a damping device on a multi-gear cassette for a rear wheel of a bicycle, wherein percussive forces produced by the chain members running from the slack span of the chain onto the sprocket are damped. This is achieved by damping the chain in the region of the chain run-in on the sprocket where no loads are borne. In one embodiment, a damping ring is provided for the purpose of supporting the chain link plates, and the tooth contour of the tooth flank which does not transmit load force is set back, and the tooth root space according to the invention is recessed toward the hub center. As such, when the chain is fed in to the sprocket, the chain link plate contacts the damping ring rather than the chain roller impacting the tooth flank or the tooth base.

14 Claims, 9 Drawing Sheets

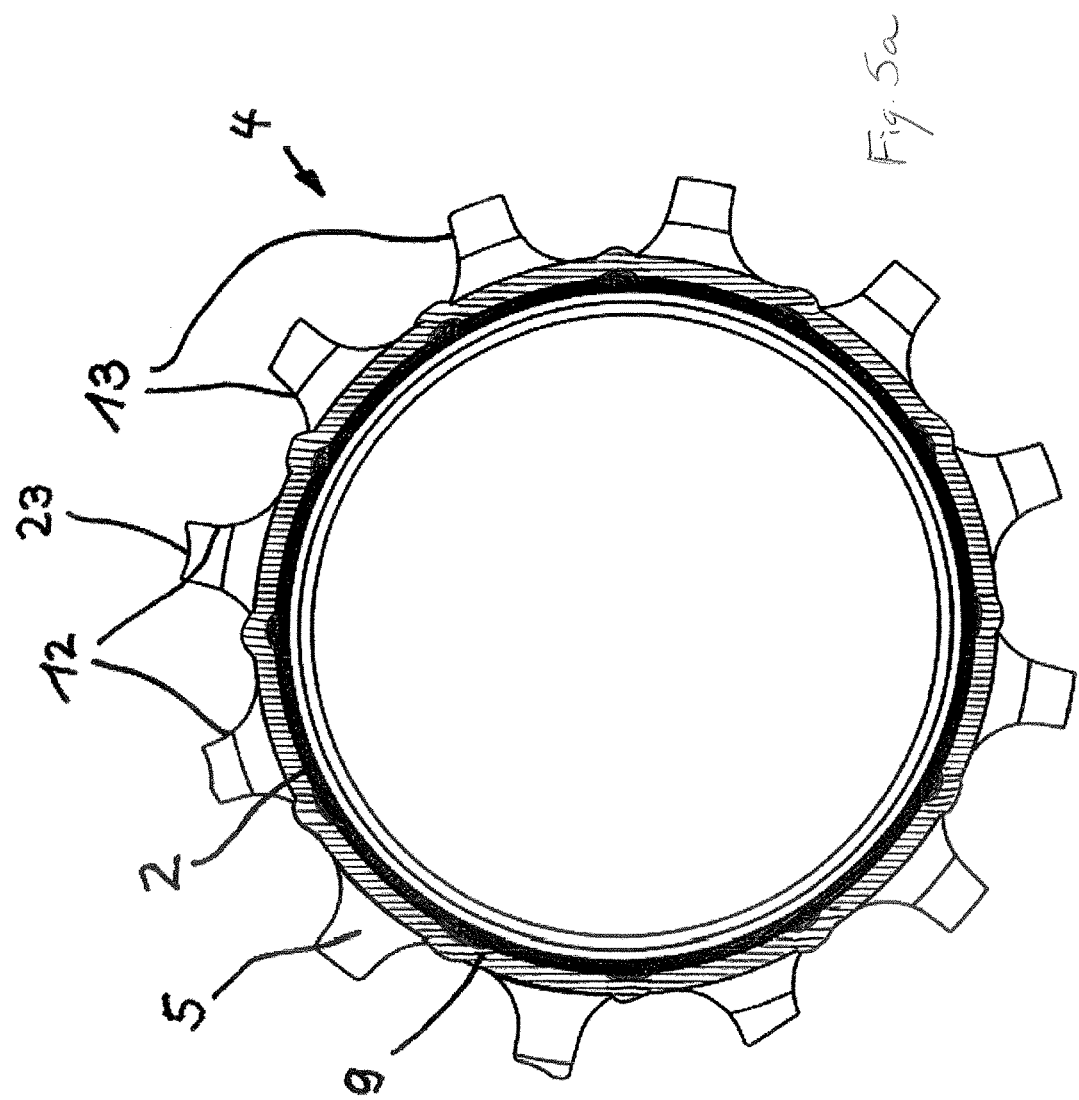

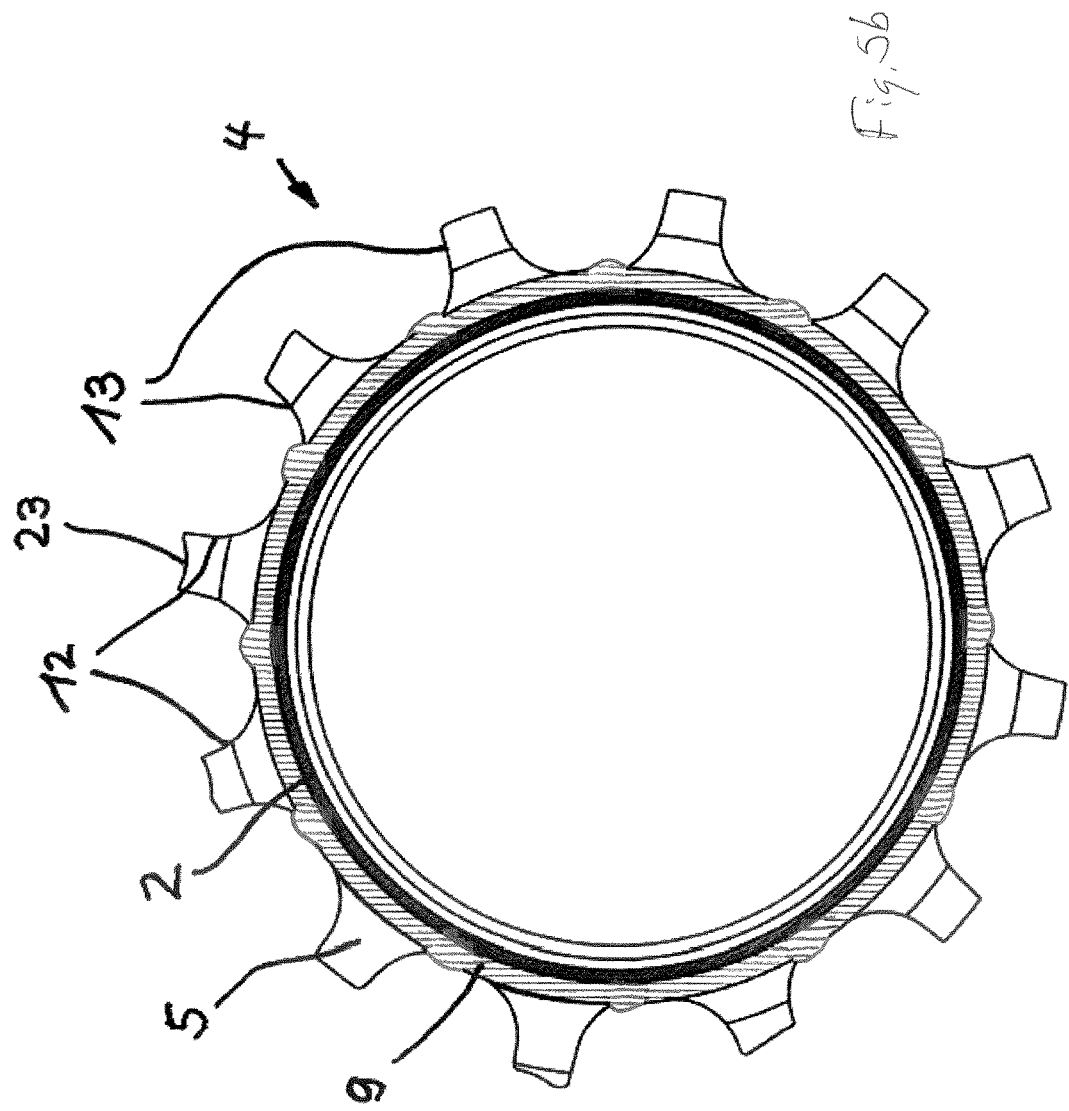

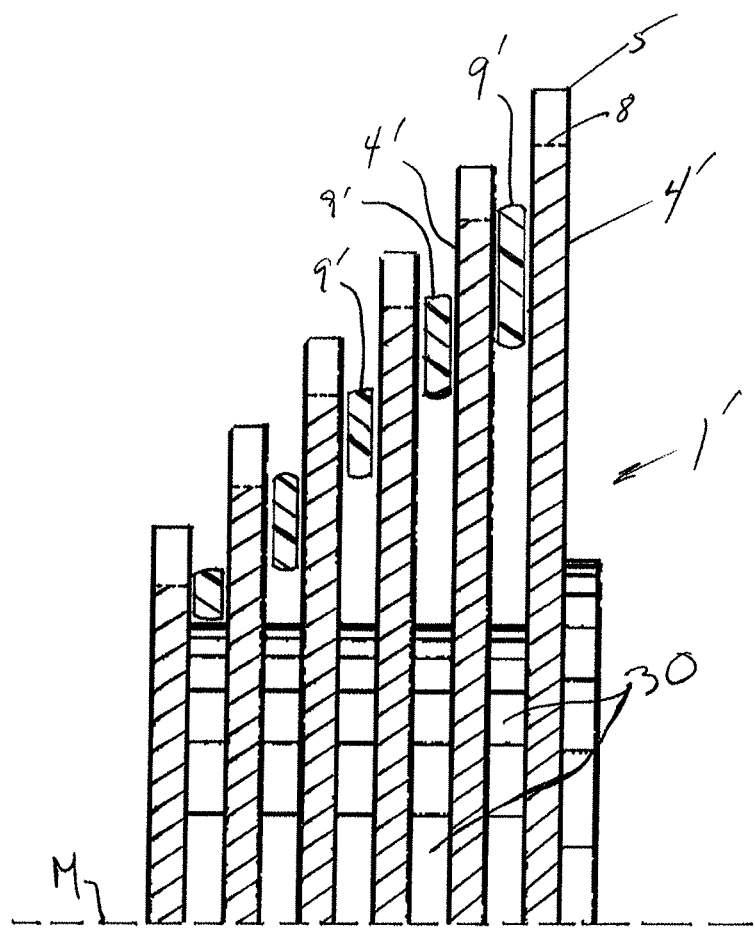

US 10,253,865 B2

MULTI-GEAR CASSETTE AND DAMPING DEVICE

BACKGROUND OF THE INVENTION

The invention relates to bicycles including a multi-gear cassette or multi-sprocket cassette with different sized sprockets for engaging a chain, such as a roller chain. In particular, the invention relates to devices and methods for the damping of noise created by the interaction of a roller chain and a sprocket of a multi-gear cassette in a drive assembly of a bicycle.

In the case of bicycle drives, it has been shown that the un-damped percussion of the chain upon the run-in of the chain onto the sprocket leads to the following perturbations. When the impact of the percussion leads to high acceleration forces exerted on the end of the chain member running in, lubricants in this area separate from the chain member. In addition, when the chain roller contacts the sprocket, the radial play is eliminated between the chain roller and the collar on the roller link plate of the chain, but only on one side of the chain roller. As a result, the lubricant occupying this free volume is squeezed out forcefully. Also, the impacts occurring when the chain rollers contact the sprocket lead to vibrations which can in turn also lead to resonances in the slack span of chain. These resonances can be perceived by the operator, and can influence the system efficiency negatively. In addition, the percussion of the chain rollers on the sprocket teeth leads to the emission of noise. These noise emissions can be additionally amplified by light and stiff drive components. This is the case with multi-gear cassettes, for example, wherein individual sprockets are connected to each other to form a single part, and into a hollow, conical support body. The conical support body is designed with thin walls for the purpose of saving weight. An example of a conical support body is shown in EP 1 972 541. The support body is excited into oscillations and functions to a certain degree as a resonator which emits sound outward.

SUMMARY OF THE INVENTION

The problem addressed by the invention is that of achieving a significant reduction in perturbations triggered by the percussion of the chain members in the slack span. This problem is addressed by the construction of a multi-gear cassette, wherein the chain roller of the chain, upon the same running in to a sprocket of the cassette, does not impact the root between the teeth of the sprocket, but rather the link plate contacts a damping element disposed between the sprockets of the cassette. In this case, it is possible to take advantage of the fact that only one of the two tooth flanks which define the root is used as the load flank, and it is not possible for a drive force propagated by the drive chain to be transmitted to the opposite flank. This effect is due to a freewheel assembly which is typically arranged in bicycle drives in the power transmission chain between the sprocket and the driven hub sleeve. A damping device including at least one damping element, which may be in the form of a rubber ring, which functions to support the chain link plates forms the damping element, and the tooth contour of the flank which does not transmit load is set back.

When the roller chain runs off of the sprocket, the invention ensures that the chain rollers which pivot off the sprocket teeth one after another are engaged with the tooth contour, and not the damping element.

The functionality of the solution according to the invention is described below with reference to a preferred embodiment.

An embodiment of multi-gear devices according to the invention will be described in the following with the use of figures.

BRIEF DESCRIPTION OF THE DRAWINGS

FIG. 5,5a and 5b are aspects of a sprocket wheel having a damping element fit to the same, viewed from the side of the larger neighboring sprocket;

FIG. 8 is a multi-gear cassette with a plurality of sprockets separated by spacers and including a plurality of damping elements according to another embodiment of the invention in a sectional view.

DETAILED DESCRIPTION OF A PREFERRED EMBODIMENT

Figure 1:
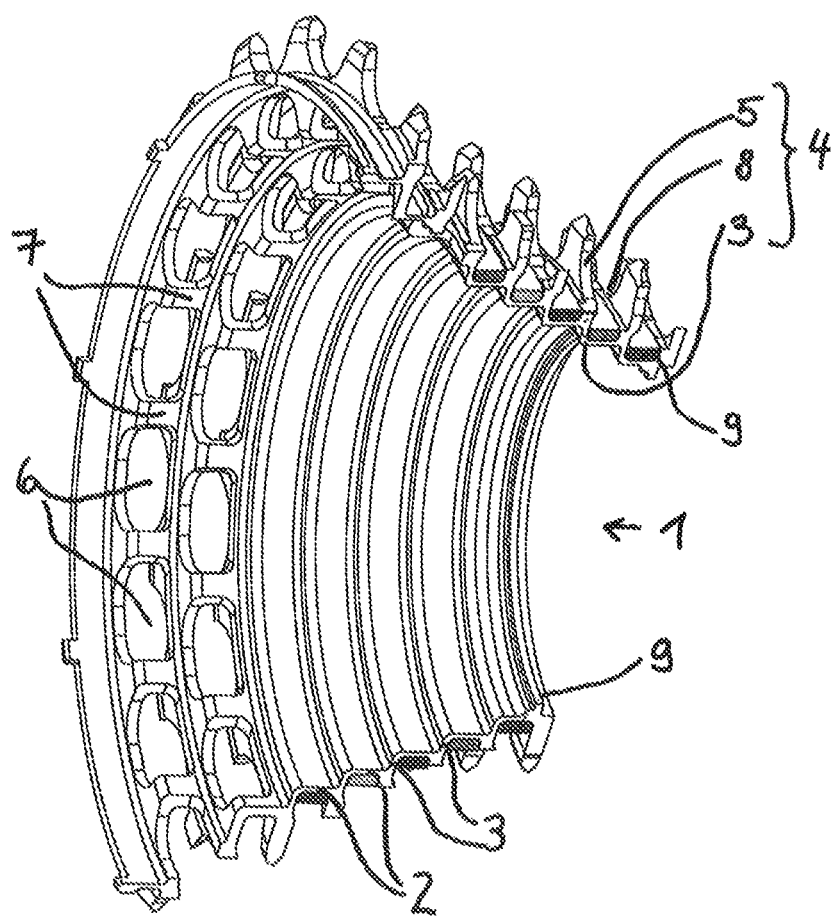
FIG. 1 is an overall illustration of a damping element on a multi-gear cassette, in a cutaway view, the damping element serving to carry out damping according to an embodiment of the invention.

A multi-gear cassette assembly is shown in FIG. 1, having a conical support body 1 which is formed by the sequential positioning of tubular segments 2 and disk-shaped segments 3. This positioning of tubular segments 2 and disk-shaped segments 3 creates a step-like profile. The aggregate of a disk-shaped segment 3 and teeth 5 in the same axial position along with a tooth root ring 8 arranged between these teeth 5 and the tubular segment 2 is characterized as a sprocket 4 in this embodiment. The tooth root ring 8 substantially has an extension in the axial direction as the teeth 5 of the associated sprocket 4.

Damping elements 9, which may be elastomeric rings of, e.g., natural and/or synthetic rubber, are arranged on the outer periphery of at least one of the tubular segments 2, between adjacent sprockets 4 and the radial thickness of the damping elements 9 around the periphery approximately corresponds to the axial extension of each tooth root ring 8 of the neighboring smaller sprocket. The rubber elements 9 have a width which may correspond to and span the space between neighboring sprockets 4.

The region of the conical support body 1 shown oriented to the left in FIG. 1 has a larger wall thickness as well as openings 6 which pass through the walls. As a result, bars or connectors 7 are formed between the sprockets 4. In one embodiment, no rubber elements 9 are present in this region of the support body 1. It is also possible to use damping elements 9 in this region, although the damping effect is lessened in this case.

Figure 2:
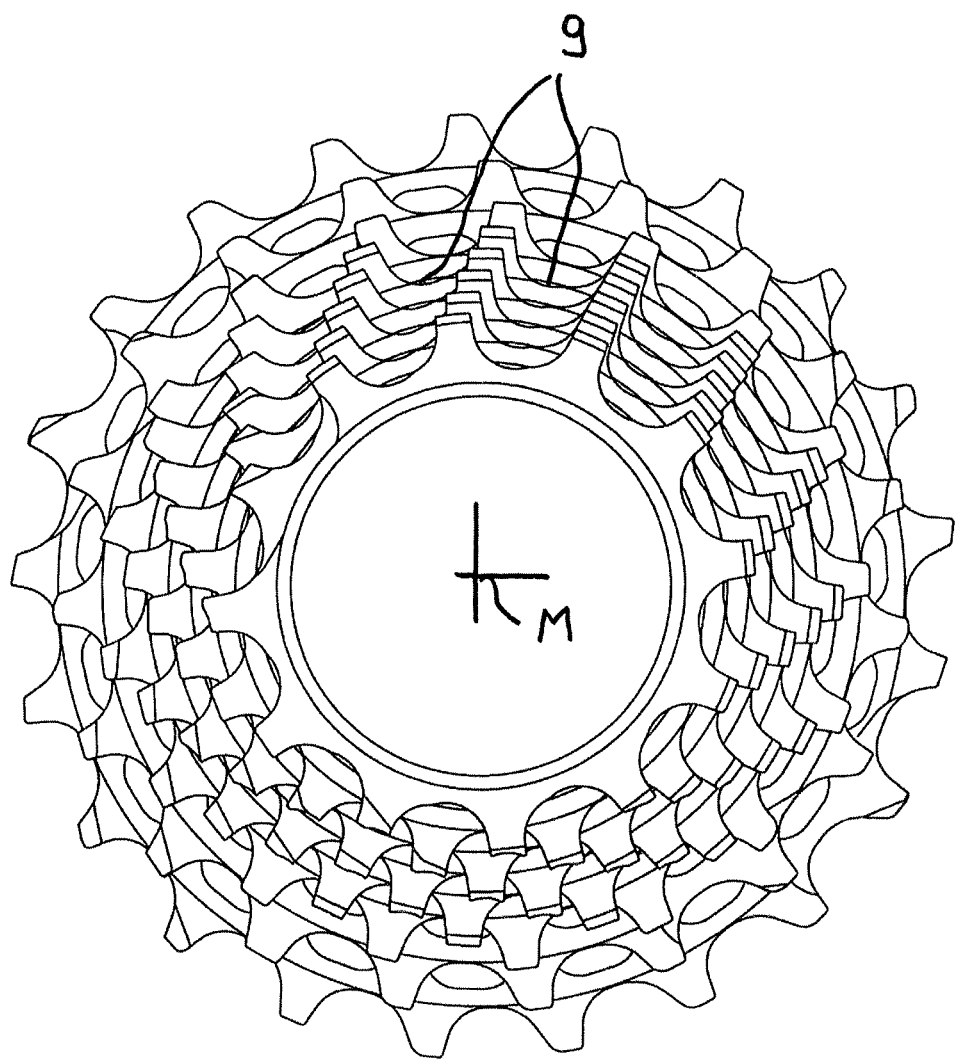
FIG. 2 is a view of the damping element on a multi-gear cassette according to FIG. 1, shown in the direction of the center axis M.
Figure 6:
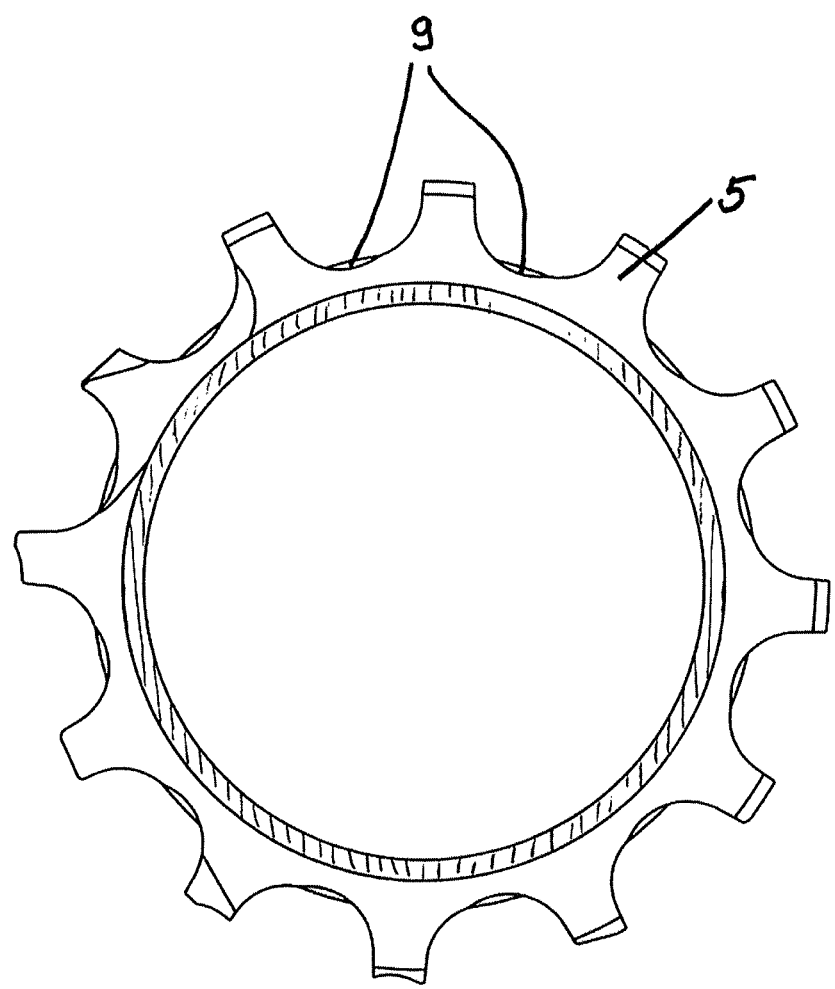
FIG. 6 is a sprocket wheel having a damping element fit to the same, viewed from the side of the smaller neighboring sprocket, cutaway along the disk-shaped section.
Figure 7:
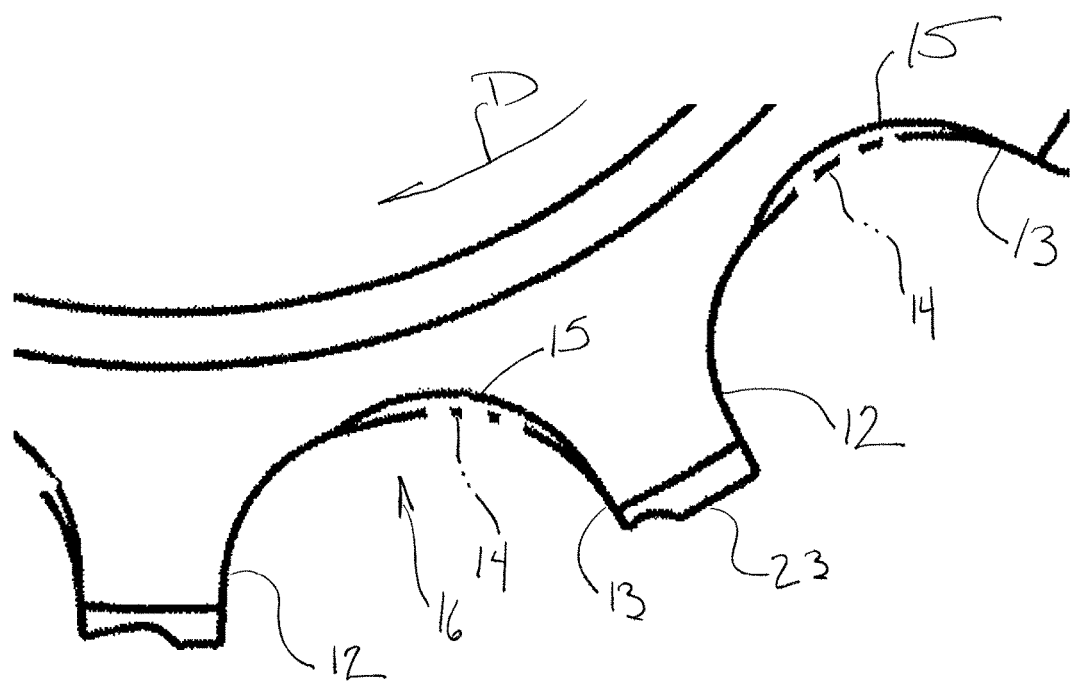
FIG. 7 is a close-up side view of the sprocket of FIG. 4.

In the view shown perpendicular to the sprockets 4 in FIG. 2, small regions of the rubber elements 9 can be seen in the tooth roots 16. This can also be seen in FIG. 6, where a sprocket 4 is shown.

Figure 4:
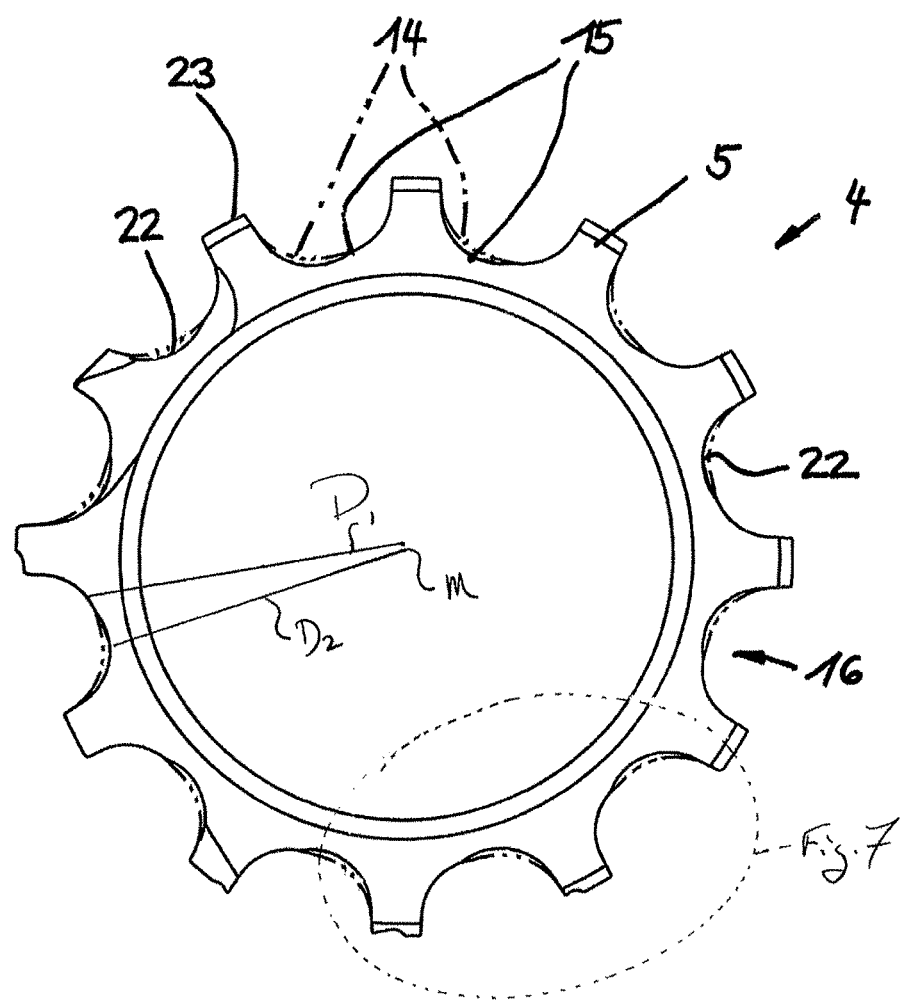
FIG. 4 is a schematic illustration of a sprocket, with a juxtaposed design of the tooth root of a conventional sprocket for comparison to the design of the tooth root according to the invention of the cassette of FIG. 1.

FIG. 5 shows the sprocket 4 in FIG. 4 viewed from the side of the neighboring larger sprocket.

Figure 3:
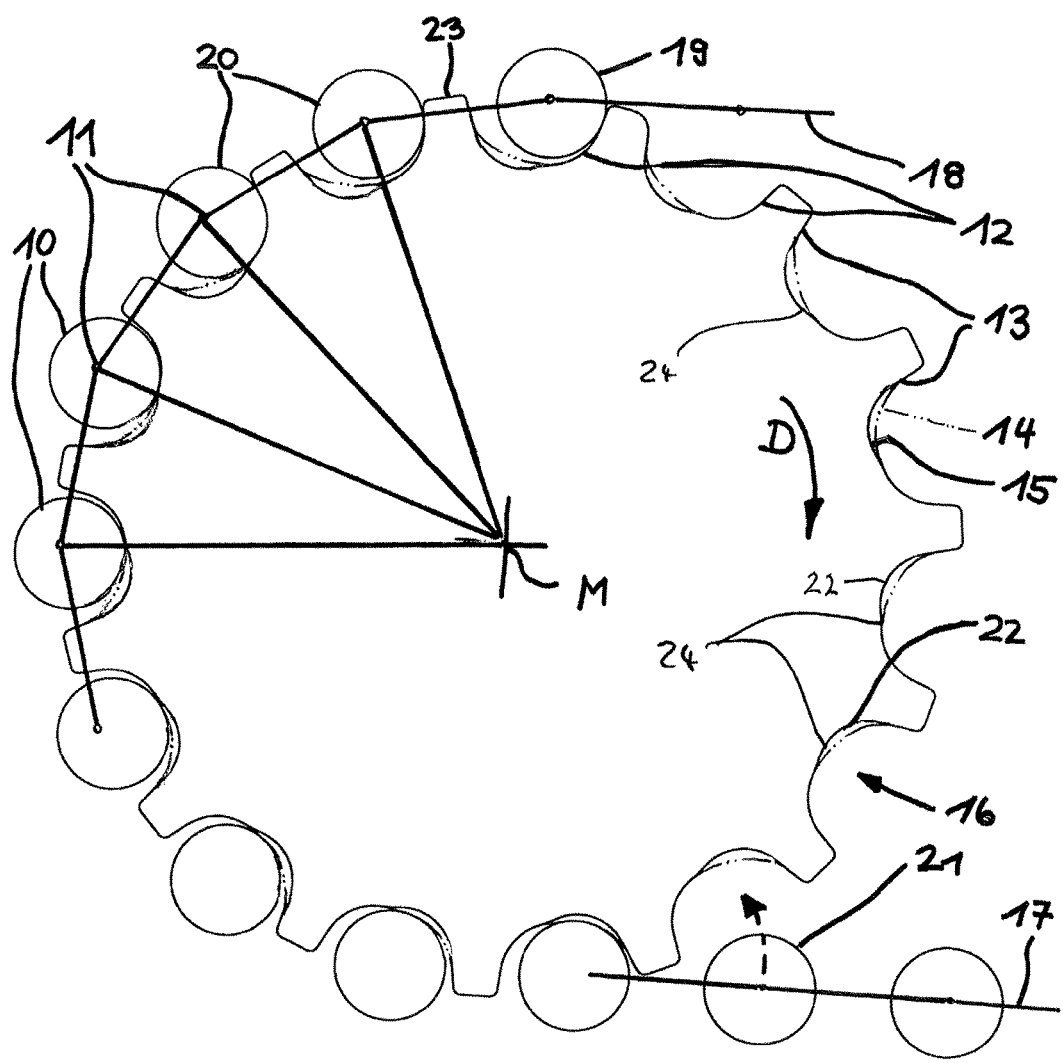
FIG. 3 is a schematic illustration of a roller chain roller running into a sprocket according to the invention.

FIG. 3 shows the design of the tooth roots 16, proceeding from a conventional sprocket having conventional tooth roots 14. In this illustration, a conventional tooth root 14 and a tooth root 15, or notched root, according to an embodiment of the invention are each shown, and the position of the chain rollers 10 corresponds to the contact ratios between chain rollers 10 and conventional tooth roots 14.

In general, the construction of a sprocket for a bicycle drive proceeds from a regular polygon. In this case, the number of the teeth corresponds to the number of sides of the polygon of equal length, and the length of the sides of the polygon corresponds to the chain units. The points 11 of the polygon correspond to the center points of the chain rollers 10 in a theoretical starting position. The position of the chain rollers 10 is displaced by the contact between the chain rollers 10 and the tooth contour, and by the action of tensile forces on the chain, preserving the pre-specified spacing of the chain link plates between the chain rollers.

The outer contour of the sprocket is constructed around the periphery of the chain rollers 10 disposed in the theoretical starting position, including an interstice measured from the radial center, said interstice being termed the clearance. As such, the chain rollers 10 receive the space they require for the chain to run in from the slack span 17 onto the sprocket, and also for the chain to run out from the sprocket to the tight span 18, the latter only indicated in FIG. 3. The clearance in conventional multi-gear cassette assemblies is approximately 0.1 mm to 0.3 mm, and the clearance at the runout portion of the load flank and at the runout portion of the opposite or non-load flank is substantially identical.

The subsequent chain roller 19 to feed into the tight span 18 and run off of the sprocket 4 butts against the load flank 12, as do the chain rollers 20 following in the direction opposed to the direction of rotation D, wherein the following chain rollers 20 are still disposed in the tooth roots 16. More chain rollers 10 follow in the direction opposed to the direction of rotation D, and are supported on the outer periphery of the tooth contour in the tooth roots 16.

The subsequent chain roller 21 running in from the slack span 17, which will pivot into a tooth root 16, encounters sufficient space because the corresponding tooth root 16 is extended along the periphery with respect to the chain roller 10 disposed in the starting position, and a base semicircle 24 is present. The chain roller 21 feeding in contacts the part of the tooth root 16 at the start of the opposite flank 13, which will also be referred to as a non-load flank, upon completing its pivoting movement. If the tooth root space 14 in this case is a conventional tooth root space, a contact noise may be produced. However, if there is a tooth root 15 according to the invention which forms a notch 22 in the tooth root, the damping element 9 can be recognized or seen projecting from the perspective parallel to the center axis M. In this case, impacts may occur but are subject to the influence of the damping element 9, and the propagation of noise is greatly inhibited. FIG. 4 shows that tooth root 14 has a first distance or radius, measured from the center axis M to the root base of $D_1$, and tooth root 15, according to the invention, has a second distance or radius $D_2$, wherein the first distance $D_1$ is greater than the second distance $D_2$. The root diameter at each of the indicated positions is two times the radius. Therefore, the respective root diameters are two times the indicated distances $D_1$, $D_2$.

Because the geometry of the tooth tips 23 is preserved, the non-load flank 13 according to the invention may have a steeper flank profile than the load flank 12. The angle in this case between the peripheral dimension and the tooth flank is smaller.

Because modern bicycle chains for chain gearings have rounded chain link plate ends which project beyond their chain rollers in the direction extending radially away from the center hub, the link plates contact the rubber element 9. As a result, a side effect of the damping device according to the invention is that the film of oil adhering to the tooth flanks are squeezed less by the chain rollers. The chain link plates impact the rubber damping element 9 rather than the chain rollers impacting with the tooth flanks.

In one implementation of the described solution, a layer of rubber can be directly applied to the tubular segment 2. Furthermore, a plastic could be used which possesses the relevant characteristics related to abrasion, elasticity, damping ability, and resistance to oil.

If openings 6 are present in the conical support body 1 in the tubular segment 2 thereof, a damping element 9 can also be used. The position of the connecting bar 7 should then be modified to provide the essential ratios required to implement the invention. In order that the outer surfaces of the damping element 9 can also project into a notch 22, as viewed from the perspective of a viewer observing the sprocket assembly in the axial direction parallel to the axis M, a bar may be positioned in a configuration displaced in the peripheral direction toward the non-load flank 13.

Referring to FIG. 8, if the individual sprockets 4' are not integral components of a hollow conical support body in a multi-gear cassette assembly, but rather are separate single components, they are mounted in sequence next to each other in the axial dimension. The tubular segments are then either connected to the sprocket as a single piece, or form separate tubular spacers 30. The damping construction according to the invention can also be used for the sprockets of such a sprocket assembly 1'. Thus, a damper assembly 9' is disposed between each of the sprockets 4' and at a level slightly radially proud of the tooth root 8 of each adjacent smaller one of each pair of sprockets 4' as discussed above.

Finally, the invention can also be realized with a damping element 9 in a modified design. For this purpose, the thickness of the damping element 9 is increased at the position along the periphery disposed at the runout portion of the non-load flank 13. It is clear that the damping element 9 used during operation of the device should be positioned along the periphery with respect to the tooth 5 on the sprocket 4. This can be performed by means of suitable measures, such as by a rigid connection to the tubular segment 2.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A multi-gear cassette for use with a roller chain of a bicycle, the multi-gear cassette comprising;
   a plurality of sprockets of varying diameters arranged coaxially about a cassette axis; and
   a damping element disposed between at least one adjacent pair of the plurality of sprockets that have different diameters, the damping element positioned to contact a chain link plate of the roller chain when the roller chain is engaged with one of the plurality of sprockets and the damping element is configured to not contact the chain link plate of the roller chain when the roller chain is running out of engagement with the one of the plurality of sprockets.

2. The multi-gear cassette of claim 1, wherein the damping element contacts the roller chain when the roller chain is engaged with a smaller one of the adjacent pair of the plurality of sprockets.

3. The multi-gear cassette of claim 2, wherein each sprocket has a plurality of teeth with a tooth root between adjacent teeth, each of the plurality of teeth including a load flank with a runout portion and a non-load flank with a runout portion, the non-load flank opposite the load flank.

4. The multi-gear cassette of claim 3, wherein the damping element includes a radial thickness, wherein the radial thickness of the damping element is greater at the tooth root adjacent the runout portion of the non-load flank of each of the plurality of teeth than at the runout portion of the load flank of each of the plurality of teeth.

5. The multi-gear cassette of claim 3, wherein the multi-gear cassette further includes a cassette body including alternating tubular segments and disk-shaped segments, wherein a radius of the tubular segment at the runout portion of each non-load flank is larger than at the runout portion of each load flank.

6. The multi-gear cassette of claim 3, each tooth root having a first root radius adjacent the load flank of each of the plurality of teeth and a second root radius adjacent the non-load flank of an adjacent tooth, the first root radius being greater than the second root radius.

7. The multi-gear cassette of claim 6, wherein the tooth root adjacent the non-load flank of each tooth includes a notch defining the second root radius.

8. The multi-gear cassette of claim 6, wherein the damping element projects radially outwardly of the second root radius.

9. The multi-gear cassette of claim 8, wherein the amount of the damping element projection is radially greater than the second root radius and less than the first root radius.

10. The multi-gear cassette of claim 2, wherein the roller chain contacts the damping element when the roller chain is running into engagement with the smaller one of the plurality of sprockets and does not contact the damping element when the roller chain is running out of engagement with the smaller one of the plurality of sprockets.

11. The multi-gear cassette of claim 10, wherein the damping element includes a plurality of damping elements arranged between adjacent pairs of the plurality of sprockets.

12. The multi-gear cassette of claim 11, wherein the cassette body includes alternating tubular and disk shaped segments and each of the plurality of damping elements is arranged on an outer periphery of each of the tubular segments.

13. The multi-gear cassette of claim 11, wherein each sprocket has a plurality of teeth with a tooth root between each adjacent tooth, each of the plurality of teeth including a load flank and a non-load flank opposite the load flank, each tooth root having a first root radius adjacent the load flank of each of the plurality of teeth and a second root radius adjacent the non-load flank of an adjacent tooth, the first root radius being greater than the second root radius.

14. The multi-gear cassette of claim 1, wherein the damping element is an elastomeric ring.

* * * * *